UNITED STATES PATENT OFFICE 2,142,324

METHOD AND PROCESS FOR PREPARING A CATALYTIC MATERIAL

Paul V. McKinney, Bartlesville, Okla., assignor to Phillips Petroleum Company, a corporation of Delaware No Drawing. Application May 5, 1936, Serial No. 78,056

6 Claims. (Cl. 23—233)

This invention relates to the preparation of a porous gel adapted to be used in the catalytic treatment of hydrocarbons.

In the preparation of catalysts upon porous supports a variety of methods have been used to distribute the active or activating material upon the support. This is particularly true in the use of silica gel as a support for catalytic material. One such method is that of Patent 1,577,188 to Patrick in which colloidal metals are distributed within a solid gel used as the support. It is difficult to activate in solution supports of this type containing very fine pores. This is due to the air held within the pores, since the activating solution fails to penetrate the solid gel. Another method has been described by Arnold and Lazier in Patent 1,939,647.

On the other hand, the supporting material may be activated for certain reactions by treating freshly precipitated silicic acid with proper solutions before drying. In order to accomplish this activation it is necessary to remove all ionic material from the silicic acid before activation. In general this has been done by washing freshly precipitated silicic acid without drying. However, this method involves the inherent and increasing difficulty of removal of ionic material from the undried silicic acid as the process nears completion.

It is the object of this invention to overcome these prior art difficulties above discussed.

It is also the object of this invention to prepare a catalytically active material upon a porous support.

A further object is the preparation of a silica gel in such a state that it is easily and completely penetrated by an activating solution.

Another object is the preparation of a synthetic aluminum silicate in an amorphous condition upon a support and having active catalytic properties.

I have found that the following method which is new and novel will result in a more active catalyst. A dilute solution of a metallic salt, such as sodium silicate, is precipitated by a diluted acid such as hydrochloric, to prepare a gel of silicic acid. The gel is broken and rinsed in water a few times to remove the excess acid. The new and important step of the process constituting my invention is that the gel should now be only partially dried. Thus it is a definite part of my invention that this drying, occurring at a temperature below 100° C., with or without the aid of a current of dry air, shall not proceed beyond a composition of the silica gel of three moles of water to one of silica gel. This composition may also be expressed as about 50% by weight of water in the partially dried gel. This composition is fairly critical, but may vary in the range of water content from 45 to 55 per cent by weight, or 3 to 4 moles of water to one of silica in the partially dried gel.

The extent of drying which I have found to be important may again be defined in terms of a physical change which occurs in the gel. Gels which are dried to this water content (3 moles water to one of silica) have a peculiar internal structure which causes the fragments to produce a musical sound when shaken against each other loosely in the hand. Gels dried to a lesser degree may be scratched with the fingernail and crumble; more completely dried gels become glassy in hardness.

The silicic acid gel partially dried as described above is easily washed free of acid ions and salt ions as desired. The wet ion-free silicic acid gel is now activated for the particular reaction required. This may usually be done by covering the wet silicic acid gel with twice its apparent volume of from 0.1 M to 1 M salt solution for example, aluminum chloride. This mixture may be allowed to stand overnight at room temperature or heated at its boiling point for one hour. The temperature and time of activation by the salt solution are not critical since the silicic acid has been prepared in a form in which it is easily penetrated. However, as is usual in chemical reactions, an increase in temperature is advantageous. Temperatures above the boiling point may be employed by using closed vessels. The activated material is finally washed free of soluble ionic material and the resulting gel dried in an air bath.

A silicic acid gel is prepared by precipitating a sodium silicate solution with hydrochloric acid. The resulting gel, or precipitate, is then washed with water to free it of acid. This washed gel is then dried to such an extent that it contains substantially not more than 45% to 55% of water, and preferably it will contain substantially 50%, under which latter condition the best product is obtained. The gel, or precipitate, dried as above described is then treated to activate the same. The gel may be activated by heating for a period of time, or by boiling for a shorter period of time for example at least one hour in a solution of an aluminum salt, which for example may be aluminum chloride. If desired the gel may be activated by allowing it to remain in the aluminum salt solution at room temperature for a sufficient period of time to effect an activation equivalent to that obtained by heating, for instance substantially twenty-four hours. In either manner of activating the gel the aluminum salt solution may be of a concentration of from 0.1 M to a saturated solution.

It has been found that when the present catalyst prepared in accordance with this invention was tested in the polymerization of proplyene the yield of liquid product per liter of propylene gas per hour per gram catalyst after twenty-four hours use was 1.25 cc., in comparison with a yield of only 0.7 cc. for the catalytic material prepared by the activation of an undried gel, and a yield of only 0.1 cc. for a catalyst prepared by activating a completely dried gel.

I claim:

1. In a process for preparing a catalyst suitable for use in the catalytic polymerization of normally gaseous unsaturated hydrocarbons, the steps which comprise preparing a hydrogel of silica, washing said silica hydrogel substantially free of free acid partially drying said acid free gel to a water content of 45 to 55 per cent by weight, washing said partially dried gel with water to remove completely all ionic material, treating the partially dried and washed gel with a solution of an aluminum salt, washing the treated gel with water and further drying the resultant activated gel.

2. In a process for the preparation of an activated silica gel suitable for the polymerization of olefin hydrocarbons, the steps which comprise preparing a hydrous silica gel, dehydrating said gel to a water content corresponding to between three and four moles of water per mole of silica, washing said silica gel with water, treating said partially dehydrated and washed silica gel with an aqueous solution of an aluminum salt whereby said silica gel becomes activated, washing said activated silica gel with water until substantially free of soluble ionic material and subsequently drying said activated and washed silica gel.

3. In a process for the preparation of a catalytically active material, the steps which comprise preparing a hydrous silica gel containing more than four moles of water to one mole of silica, partially dehydrating said gel to a water content of between three and four moles of water per mole of silica, washing said partially dehydrated silica gel with water until said gel is substantially free of water-soluble material, treating said washed gel with an aqueous solution of an aluminum salt of a strength greater than 0.1 molar, whereby said silica gel becomes activated, and subsequently washing said activated gel with water and drying said activated and washed gel.

4. In a process for the preparation of a catalytically active material, the steps which comprise preparing a hydrous silica gel containing substantially more than 55 per cent by weight of water, partially dehydrating said silica gel to a water content of between 45 and 55% by weight, washing said partially dehydrated gel with water until said gel is substantially free of water-soluble material, treating said partially dehydrated and washed gel with an aqueous solution of an aluminum salt at about the boiling point of said solution for at least one hour whereby said gel is activated, washing said activated gel with water until the wash water is substantially free of the acid ions of said aluminum salt and subsequently drying said activated and washed silica gel.

5. An improved process for the preparation of a catalytically active material, which comprises the steps of preparing a hydrous silica gel containing more than 55 per cent by weight of water, partially drying said gel to a water content of between 45 and 55 per cent by weight, washing said partially dried gel with water until said gel is substantially free of water soluble material, treating said washed gel with an aqueous solution of aluminum chloride of a strength greater than 0.1 molar whereby said silica gel becomes activated, washing said activated gel with water until the wash water is substantially free of chloride ions and subsequently drying said activated and washed gel.

6. An improved process for the preparation of an activated silica gel suitable for the polymerization of olefin hydrocarbons, which consists in preparing a hydrous silica gel containing substantially more than 55 per cent by weight of water, partially drying said silica gel until it contains between 45 and 55 per cent by weight of water, washing said partially dried silica gel with water until said gel is substantially free of water soluble material, treating said partially dried and washed gel with an aqueous solution of an aluminum salt of a strength between 0.1 and 1.0 molar at a temperature of about 100° C. for a period of about one hour whereby said silica gel is activated, washing said activated gel with water until the wash water is substantially free of the acid ions of said aluminum salt and subsequently drying said activated and washed silica gel.

PAUL V. McKINNEY.